(12) United States Patent
Kurtz et al.

(10) Patent No.: US 6,895,822 B2
(45) Date of Patent: *May 24, 2005

(54) APPARATUS AND METHOD FOR INTERCONNECTING LEADS IN A HIGH TEMPERATURE PRESSURE TRANSDUCER

(75) Inventors: Anthony D. Kurtz, Ridgewood, NJ (US); Scott J. Goodman, Wayne, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/609,786

(22) Filed: Jun. 30, 2003

(65) Prior Publication Data

US 2004/0261535 A1 Dec. 30, 2004

(51) Int. Cl.⁷ ............................................... G01L 19/04
(52) U.S. Cl. ........................... 73/708; 73/746; 338/306; 338/308
(58) Field of Search ............. 73/700–756; 338/306–308

(56) References Cited

U.S. PATENT DOCUMENTS

| | | | |
|---|---|---|---|
| 3,800,264 A | | 3/1974 | Kurtz et al. ................... 338/2 |
| 4,106,349 A | * | 8/1978 | Kurtz ........................... 73/746 |
| 4,815,472 A | * | 3/1989 | Wise et al. .................... 73/718 |
| 4,881,410 A | * | 11/1989 | Wise et al. .................... 73/724 |
| 4,994,781 A | * | 2/1991 | Sahagen ........................ 338/47 |
| 5,973,590 A | | 10/1999 | Kurtz et al. ................... 338/42 |
| 6,363,792 B1 | | 4/2002 | Kurtz et al. ................... 73/753 |
| 6,530,282 B1 | | 3/2003 | Kurtz et al. ................... 73/756 |
| 6,679,099 B2 | * | 1/2004 | Fujita et al. ................. 73/23.2 |

* cited by examiner

Primary Examiner—Edward Lefkowitz
Assistant Examiner—Alandra Ellington
(74) Attorney, Agent, or Firm—Plevy, Howard & Darcy, PC

(57) ABSTRACT

A novel method for interconnecting leads in a high pressure transducer without the use of solder employs a ceramic disc containing a number of through holes. Each hole has a tube inserted therein, which tubes are connected to the disc by brazing or a high temperature attachment. Each tube protrudes from both sides of the ceramic. The ceramic is coated in appropriate areas with molymanganese film, which is over plated with gold. This overcoat forms a brazed compound surface attached to the tubes of the ceramic. A semiconductor pressure transducer has output leads which are inserted through the ceramic into each tube. The other side end of the tube receives high temperature wires from a suitable connecting device. Each tube is then crimped and spot-welded to hold both the lead from the transducer and the high temperature leads to produce a strong bond without the use of solder. The header itself it typically welded to a pressure point.

10 Claims, 5 Drawing Sheets

US 6,895,822 B2

APPARATUS AND METHOD FOR INTERCONNECTING LEADS IN A HIGH TEMPERATURE PRESSURE TRANSDUCER

FIELD OF INVENTION

The present invention relates to high temperature pressure transducers, and more particularly, to an apparatus and a method for interconnecting leads in a high temperature pressure transducer without the use of a conventional solder, or without the use of conventional interconnecting means.

BACKGROUND OF THE INVENTION

As one can ascertain, the need for semiconductor pressure transducers that can be used in harsh environments, including extremely high temperatures, has greatly increased. Such transducers, for example, are utilized in jet planes and can be positioned within the engines and other places in the aircraft, which involve extremely high temperatures.

For example, for such problems, reference is made to U.S. Pat. No. 6,530,282 entitled, "Ultra High Temperature Transducer Structure" which issued on Mar. 11, 2003 to A. D. Kurtz et al. and is assigned to the assignee herein, Kulite Semiconductor Products, Inc. In that patent, there is described a hermetically sealed high temperature pressure transducer, which essentially includes a sensor wafer. There is a first header assembly coupled to the wafer, which includes a plurality of pins. Each of the pins are conventionally coupled to an associated contact area. The patent shows a second header assembly, which is coupled to the first assembly and to the sleeve. This header assembly includes a plurality of tubes. A wire or pin is positioned in each of the tubes. Then a temperature insulated cable is partially positioned within the sleeve and includes a plurality of wires which are coupled to the pins. A third header apparatus is coupled to the sleeve and includes a plurality of closed end tubes for serving as leads, where each one of the plurality of wires is positioned and then coupled to a respective closed end tube.

Essentially, the apparatus is shown best in FIGS. 5A and 5B of the patent, which shows the leads emanating from the transducers which are then directed into tubes, where the tubes also contain the connecting cable wires 40. Thus, as seen in that patent, each of the tubes contains a lead that emanates from the transducer another lead that is associated with an output cable.

U.S. Pat. No. 6,363,792 issued on Apr. 2, 2002 and is entitled, "Ultra High Temperature Transducer Structure" by A. D. Kurtz et al. and also assigned to the assignee herein, is the parent application which issued into a patent concerning the high temperature transducer structure. It is therefore apparent, even though the prior art shows many high temperature transducer structures, there is a need for an improved structure and the present invention relates to a novel and new method and apparatus for interconnecting leads in a high temperature pressure transducer without the use of solder.

SUMMARY OF INVENTION

A high temperature transducer which has a plurality of transducer output leads and a ceramic substrate which has a plurality of apertures. The substrate has deposited thereon a surface of a plurality of metallized areas, each area associated with one of the apertures, and a plurality of conductive tubes, each tube associated with an aperture on the substrate and coupled about the aperture via the metallized area, each tube accommodating one of the output leads from the transducer, which lead is directed through the aperture into the tube. A plurality of output leads each having a lead associated with and inserted into an associated tube, includes means for connecting the output lead to the transducer lead via the tube.

DETAILED DESCRIPTION OF THE FIGURES

Figure 1:
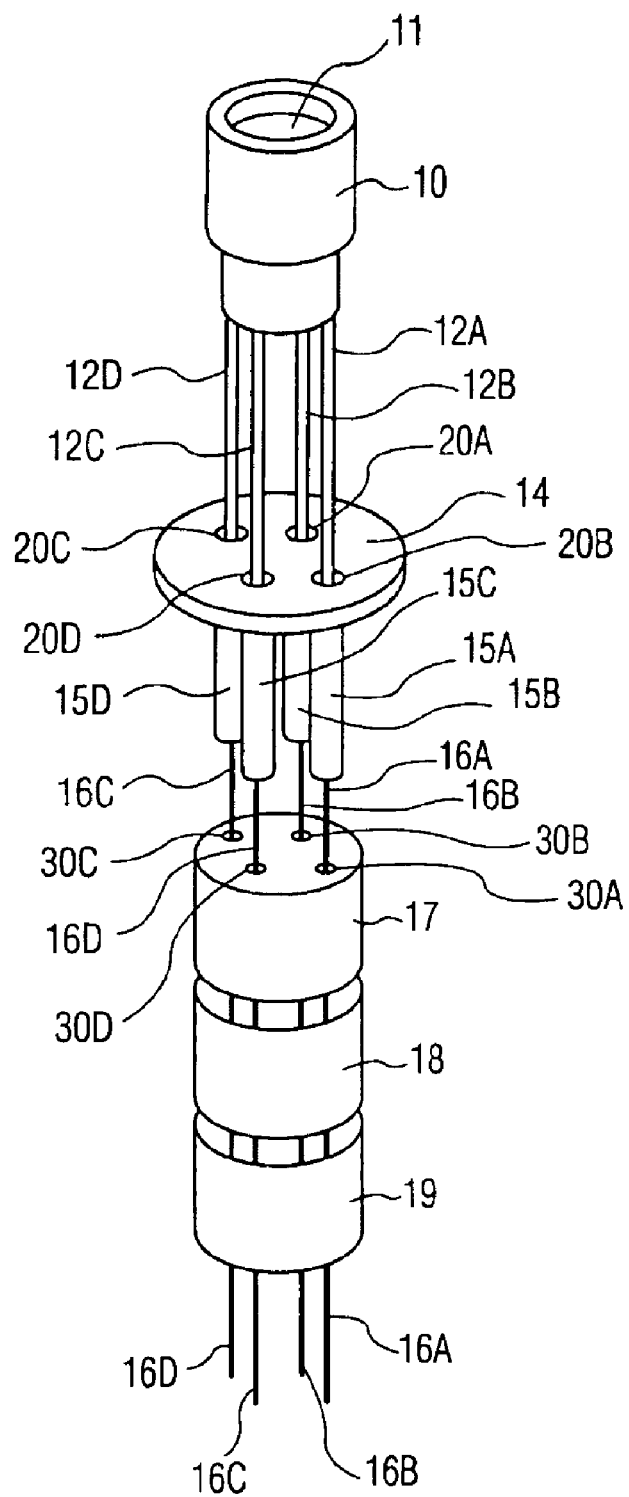
FIG. 1 is a perspective view of a transducer assembly, according to this invention.

Referring to FIG. 1, there is shown a high temperature transducer, according to this invention. The high temperature transducer depicted by reference numeral 11 is enclosed with a metal header 10 and leads emanating from the transducer are shown as 12A, 12B, 12C and 12D. As one can ascertain, there may be more than four leads. The transducer, as included in the metal header 10, is a semiconductor sensor device, which includes a semiconductor diaphragm member having a top surface coated with an oxide layer. There are p+ sensor elements fusion bonded to the oxide layer as a relatively central area of the diaphragm. The structure contains p+ finger elements fusion bonded to the oxide layer, which extends from the sensors to an outer contact location of the diaphragm for each finger. There is an external rim of p+ material fusion bonded to the oxide layer and surrounding the sensors and fingers. A glass wafer is electrostatically bonded at the bottom surface to the fingers and rim to hermetically seal the sensors and fingers of the diaphragm member. The first glass wafer includes a depression above the sensors, as a plurality of apertures, where each aperture is associated with a separate finger at the contact location, each aperture is smaller than the associated finger lining up with the contact location. Each contact location is accessed via the associated aperture in the first glass member.

A second glass wafer is sealingly coupled to the top surface of the first glass wafer and has a plurality of apertures aligned with the plurality of apertures of the first glass wafer and contains a group of hermetically sealed pins coupling to the contact locations. This structure is shown in U.S. Pat. No. 5,973,590 entitled, "Ultra Thin Surface Mount Wafer Sensor Structures and Methods of Fabricating the Same" which issued on Oct. 26, 1999 to A. D. Kurtz et al. and is assigned to the assignee herein. The entire disclosure of that patent is incorporated herein by reference.

It is also seen that other high temperature transducers utilizing glass housings are also disclosed in the prior art. See, for example, U.S. Pat. No. 3,800,264 entitled, "High Temperature Transducers and Housings Including Fabrication Methods" which issued on Mar. 26, 1974 to A. D. Kurtz et al. and is assigned to the assignee herein. That patent describes a dielectrically isolated pressure transducer, which includes a silicon diaphragm having on a surface thereof a piezoresistive element mounted in close proximity with a dielectric insulated diaphragm and secured about a non-active peripheral area to an annular ring housing by a glass bond fabricated from a glass material having a low-melting temperature when compared to another glass. As one can ascertain, there are many high temperature transducers depicted in the prior art.

Leads 12A to 12D, as emanating from the transducer structure, are now positioned within apertures 20A to 20D of a ceramic. The ceramic disc 14 contains a number of tubes, as for example, 15A to 15D, which are attached to the ceramic structure by brazing or some other high temperature attachment. As you can see, each tube basically protrudes from the ceramic member 14 and essentially, as will be explained, each tube protrudes from both sides. The tubes are metallic tubes and can be fabricated from many different materials, such as nickel, stainless steel, or other metallic materials. The tubes act as a coupling means, whereby wires 16A to 16D are inserted into the tubes with the wires emanating from the transducer 12A to 12D also inserted into the tubes. The tubes are then crimped and spot-welded so that both wires from the bottom portion, as wires 16A to 16D and wires 12A to 12D, are inserted into the tubes and captured therein, whereby the tubes are then crimped and spot-welded to assure that the wires are completely coupled one to the other. The wires, for example, as 16A to 16B, are nickel wires. Each of the wires is then inserted into an aperture in a ceramic insulating member 17. Ceramic insulating tubes or inserts 17, 18 and 19 are directed along the wires and act as insulators for the wires. As seen, each of the ceramic inserts has apertures, such as 30A to 30D, which are directed through the ceramic insert and which serve to isolate each of the output wires as 16A, 16B, 16C and 16D.

Figure 2:
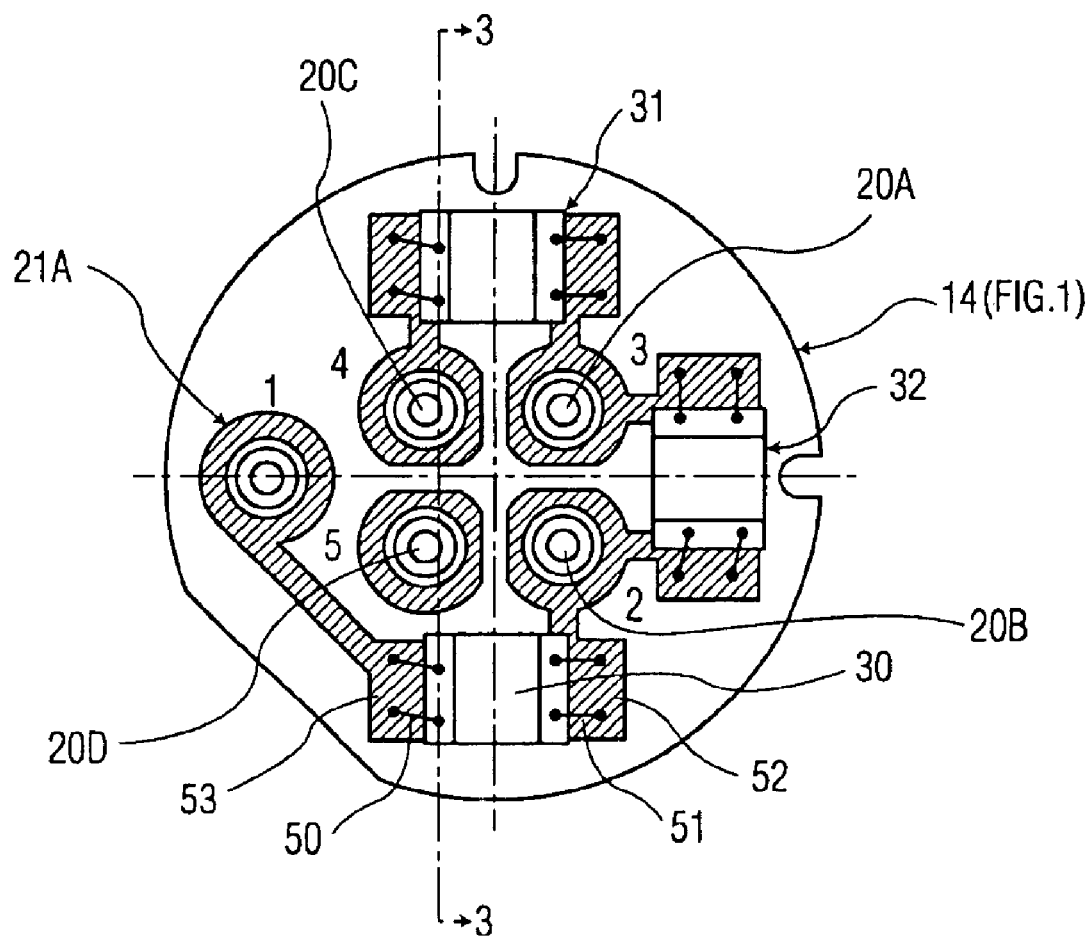
FIG. 2 is top plan view of a ceramic substrate used in this invention.

Referring to FIG. 2, there is shown a ceramic disc 14 as shown in FIG. 1. Essentially, the ceramic disc is relatively thin and is approximately 0.25 inches in thickness and approximately 0.025 inches in diameter. As seen in FIG. 2, the ceramic disc 14 has deposited thereon a nickel gold plate which is fabricated over molymanganese metallization. It is well-known how to metallize ceramic materials, as ceramic materials have been metallized by many known techniques. As seen in FIG. 2, there are the lead accommodating apertures 20A to 20D. As indicated in regard to FIG. 1, each of the apertures 20A to 20D accommodate one of the wires or leads 12A to 12D from the transducer structure 11. Also seen in FIG. 2 is an input aperture designated as 21A. The aperture 21A is directed towards a resistor area 30, which resistor area accommodates a chip resistor for providing compensation to the piezoresistive bridge.

Figure 4:
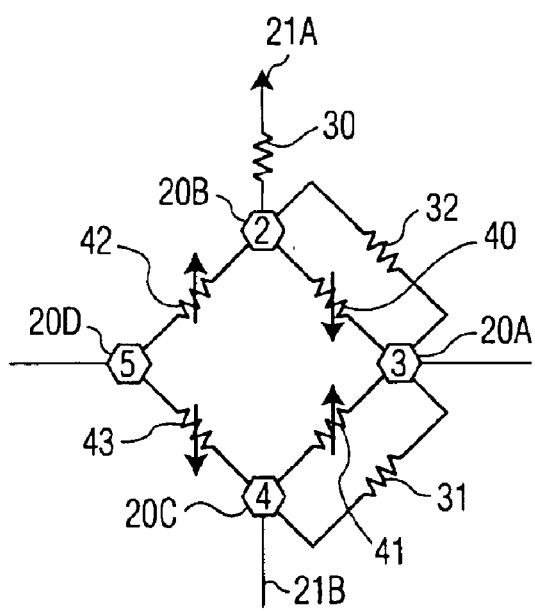
FIG. 4 is a schematic diagram of a typical Wheatstone bridge array using piezoresistive sensors and compensating resistors according to this invention.

As indicated above, the bridge is fabricated from piezoresistors which exist on a semiconductor substrate associated with the transducer 11. The piezoresistor sensor configuration essentially consists of a Wheatstone bridge configuration, which basically includes four piezoresistors arranged in a bridge. This is shown in FIG. 4. The piezoresistive sensing devices are arranged in a bridge configuration on the substrate 11, as describe above. The resistors are designated by reference numerals 40, 41, 42 and 43. Each resistance value has an arrow therethrough depicting that they are variable. As seen, the aperture or contact area 21A is directed to a first resistor 30, which again, is coupled to terminal 20B, which is directed through the piezoresistor to terminal 20A. The terminals 20B and 20A are shunted by a chip or span resistor 32 in a similar manner terminals 20A and 20C are shunted by span resistor 31. The bridge has inputs designated by terminals 21A and 21B and outputs designated by terminals 20D and 20A. This is a typical bridge configuration. Each resistor is a chip resistor which is bonded to a terminal pad associated with the resistor by means of four bond wires, as, for example, wires 50 and 51 associated with terminal pads 52 and 53. As indicated, the ceramic substrate is treated with a molymanganese metallization which is deposited through a photolithographic technique or otherwise deposited by typical ceramic procedures. This is then coated with a nickel gold plate.

Figure 3:
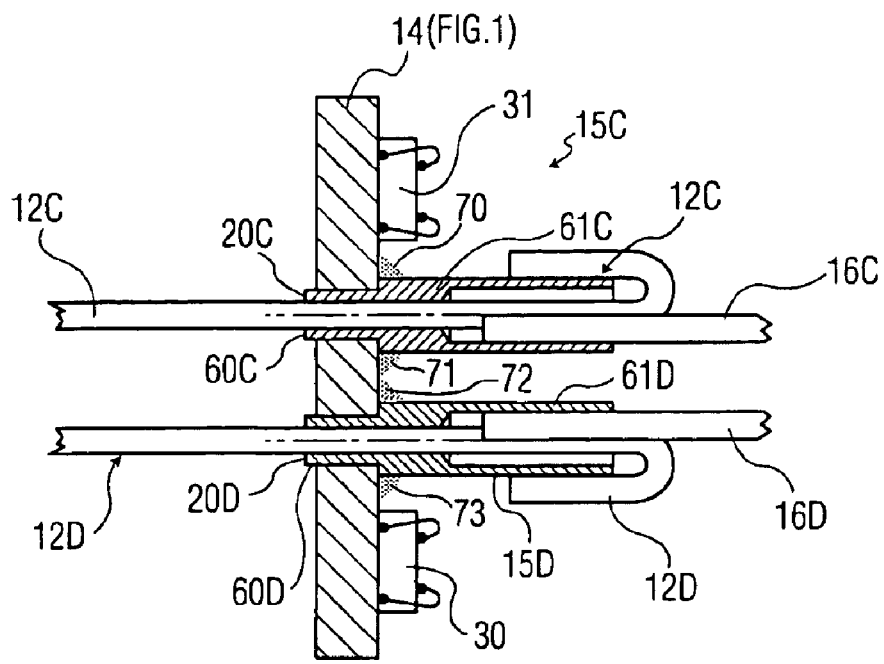
FIG. 3 is a cross sectional view taken through line 3—3 of FIG. 2 according to this invention.

FIG. 3 is a cross sectional view, taken through line 3—3 of FIG. 2. As is shown in FIG. 3, the lead 12C, which emanates from the transducer 11, is directed through aperture 20C. The lead 12C is bent in a U-shaped manner, with one side abutting or contacting the outer peripheral edge of the tube 15C. As seen in FIG. 3, there is a tube 15C and a tube 15D. Each of the tubes 15C and 15D are associated with the respective apertures 20C and 20D. There are identical tubes 15A and 15B (not shown) associated with apertures 20A and 20B. As seen clearly in FIG. 3, each tube has a front end portion 60C and 60D, which is of a smaller diameter than the back portion 61C and 61D. In this manner, the wires 12C and 12D extending from the transducer are directed into the apertures 20C and 20D and go into the front portion of the tube and reside in the rear portion of the tube. Each tube is hollow, but has a larger rear diameter than the front diameter. The rear diameter also accommodates the leads, as for example, 16C and 16D. These leads are placed in the tubes as well. The leads are forced into the tube, where the wires from the sensor devices 12C and 12D are crimped and spot-welded to the tube at portions 61C and 61D. The permanent leads, or output leads, as 16C and 16D, are also placed in the apertures of the tubes and abut against the leads 12C and 12D. At this point, the tubes are crimped to thereby force or connect lead 12C to lead 16C by indenting and welding the tube 61C and to thereby connect lead 16D and 12D by indenting the tube 61D. The tubes, as 61C and 61D, as indicated, are crimped and then spot-welded to firmly ensure the engagement of leads 12D and 12C to leads 16D and 16C. This, of course, is done for leads 16A and 16B.

As indicated, the ceramic itself is coated in appropriate areas with a molymanganese film, which is over plated with gold. This over plate, in fact, forms the braze compound, which serves to attach the various tubes to the ceramic. The brazing is shown in FIG. 3 by dashed indications shown by areas 70, 71, 72 and 73. In this manner, the tubes are brazed to the molymanganese gold overcoat to enable each of the tubes to be firmly secured to the ceramic. The tubes are secured to the ceramic, but are electrically isolated from one another. As seen also in FIG. 2, the resistors, which are thin film resistors, are mounted between the contact areas using a high temperature ceramic such as a Pyroceram. The gold molymanganese substrate is also suitable for ball bonding leads thereon. The substrate, as indicated in FIGS. 3 and 2, appears both on the top and bottom surfaces.

The structure is suitable for maintaining good electrical contact at temperatures in excess of 1000° F. and does not require a brazed or soldered joint joining the two wires together. There are provisions on a substrate structure for including both the series in shunt resistors in order for a temperature compensation of the transducer without the use of solder. These compensation resistors, such as shown as resistors 31, 32 and 30, as seen in FIG. 4, are also fastened to the substrate using a high temperature ceramic, such as Pyroceram.

Figure 5:
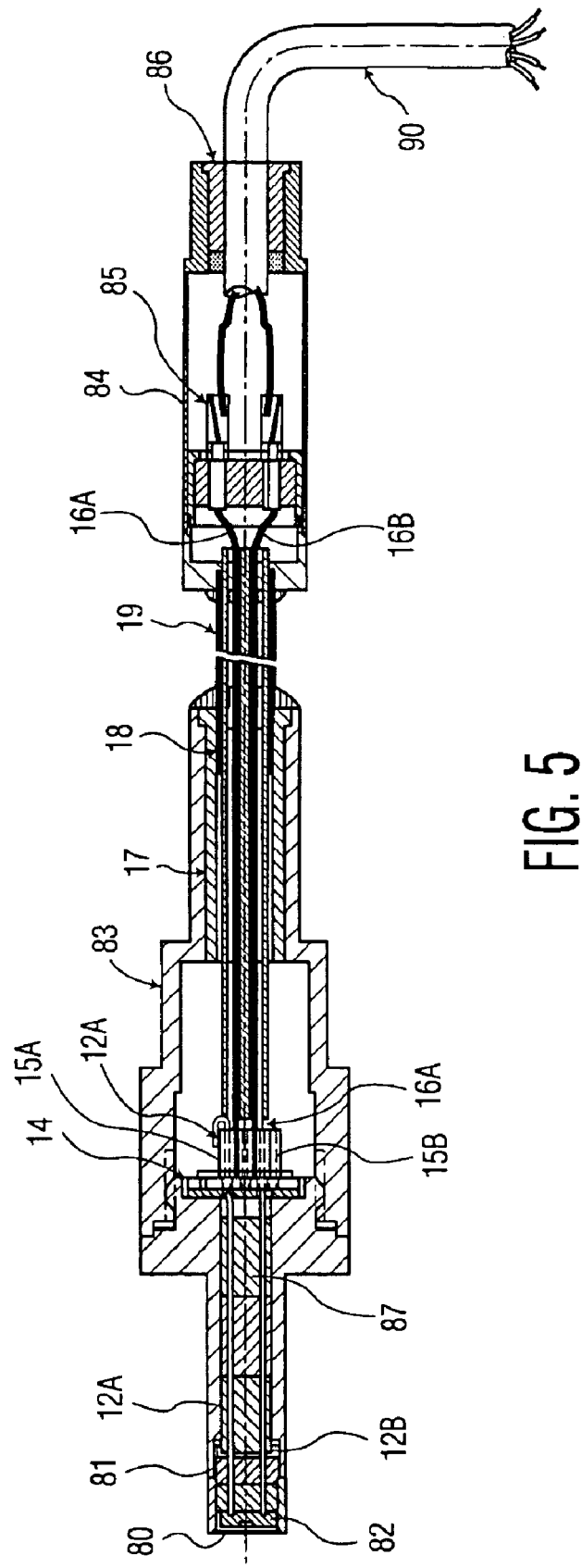
FIG. 5 is a cross sectional view of a transducer assembly according to this invention.
Figure 6:
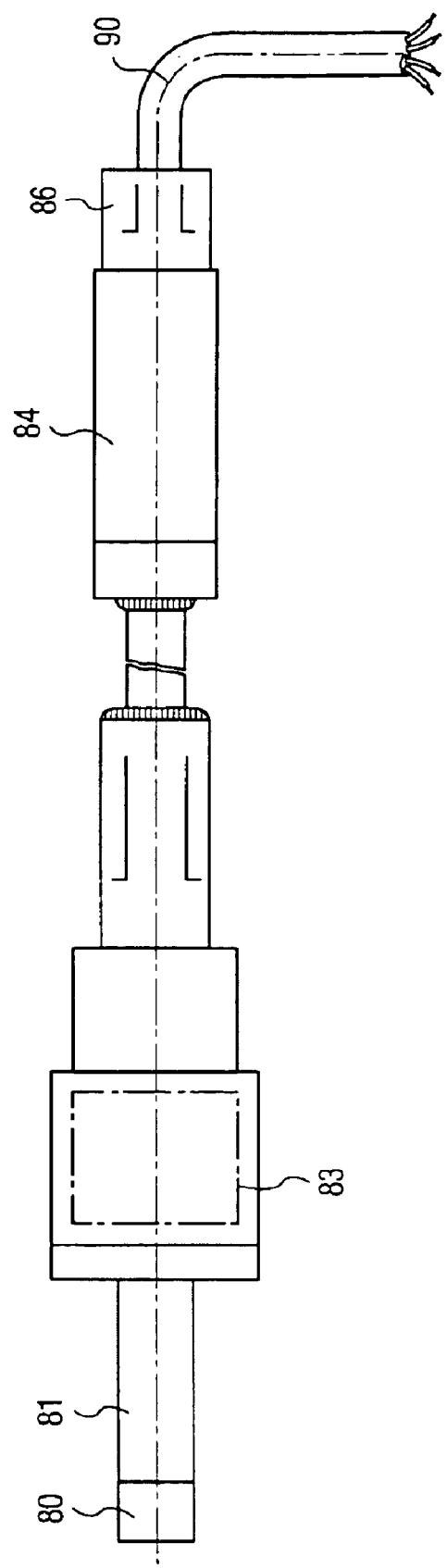
FIG. 6 is a side view of the transducer assembly shown in FIG. 5 according to this invention.

FIGS. 5 and 6 basically show the entire transducer configuration, where FIG. 6 shows the assembly and FIG. 5 shows the cross sectional view of the assembly shown in FIG. 6. As can be seen in FIG. 6, the assembly basically consists of a plurality of housing sections such as 80, 81, 83, 84 and 86 which terminate in a high temperature cable 90. As seen in FIG. 5, the transducer 82 is located in the front section 80 where the front section 80 terminates into section 81, the transducer has the pins 12A and 12B extending therefrom, which can be supported by glass support devices such as 87 for high temperature operation. The transducer is a leadless diaphragm, which is glassed to a header in section 81. The pins extend into the ceramic insert for insertion through the apertures in the ceramic, which have connected thereto the tubes such as 15A and 15B. As seen, the pins 12A are crimped and spot-welded at that point. The tubes also accommodate the nickel wires from the high temperature cable 90, which are inserted into the tubes and crimped and spot-welded together with the leads 12A and 12B, as emanating from the transducer. The nickel leads from the high temperature cable 90 are directed through the ceramic spacers 17, 18 and 19, where they direct to housing section 84, which housing section 84 contains the wires 16A and 16B extending into a terminal block, which has a pin 85, whereby the wires as 16A and 16B are coupled to the high temperature wires from cable 90. The terminating housing 86 is also shown.

Thus, it seems as if the major aspect of the above-described transducer describes a novel method for interconnecting leads in high pressure temperature transducers without the use of a solder. The basic structure includes the ceramic disc containing a number of tubes. The tubes are connected or coupled to the ceramic disc by brazing or a high temperature attachment. Each tube, as indicated, protrudes from both sides of the ceramic. The ceramic itself is coated within appropriate areas with a molymanganese film which is over plated with gold. The other plate, in fact, forms a brazed compound which serves to attach the tubes to the ceramic. There are additional areas in the molymanganese gold overcoat emanating from each of the through holes in the ceramic, but electrically isolated from each other. These additional areas as shown above are used to mount the thin film resistors between two adjacent contact areas using a high temperature ceramic, such as Pyroceram.

What is claimed is:

1. A high temperature transducer system, comprising:
   a transducer having a plurality of transducer leads,
   a ceramic substrate having a plurality of apertures, said substrate having deposited on a surface thereof a plurality of metallized areas, each area associated with one of said apertures,
   a plurality of conductive tubes, each tube associated with one of said aperatures in said substrate and coupled about said associated aperture via one of said metallized areas, each tube accommodating one of said transducer leads, which transducer lead is directed through said associated aperture into said accommodating tube,
   a plurality of output leads, each output lead associated with and inserted into an associated one of said tubes; and
   means for connecting each said output lead to an associated transducer lead via said associated tube.

2. The high temperature transducer system according to claim 1 wherein said means is a crimp on each tube for securing said transducer lead to said output lead.

3. The high temperature transducer system according to claim 1 wherein said ceramic substrate includes resistors for compensating said transducer.

4. The high temperature transducer system according to claim 1 wherein said output leads are nickel.

5. The high temperature transducer system according to claim 1 further comprising a ceramic insulator member having a plurality of apertures, each aperture containing one of said output leads and operative to isolate said output leads.

6. The high temperature transducer system according to claim 1 wherein said transducer leads are inserted through said associated tube and bent to contact the outer tube surface.

7. The high temperature transducer system according to claim 1 wherein said transducer is a piezoresistive transducer.

8. The high temperature transducer system according to claim 1 wherein said tubes are brazed to said ceramic substrate about said metallized area.

9. The high temperature transducer system according to claim 8 wherein said metallized areas are molymanganese metal.

10. The high temperature transducer system according to claim 9 wherein said molymanganese metal areas are overcoated with gold.

* * * * *